United States Patent [19]

Tobinaga et al.

[11] Patent Number: 4,790,279

[45] Date of Patent: Dec. 13, 1988

[54] IGNITION CONTROL SYSTEM FOR AN INTERNAL COMBUSTION ENGINE

[75] Inventors: Motoi Tobinaga; Shigeo Okumura; Kenichi Handa, all of Hamamatsu; Shinya Atsumi, Kobayashi, all of Japan

[73] Assignee: Sanshin Kogyo Kabushiki Kaisha, Japan

[21] Appl. No.: 104,520

[22] Filed: Sep. 30, 1987

Related U.S. Application Data

[60] Continuation of Ser. No. 945,185, Dec. 23, 1986, abandoned, which is a continuation of Ser. No. 842,821, Mar. 24, 1986, abandoned, which is a division of Ser. No. 611,846, May 18, 1984, Pat. No. 4,606,315.

[30] Foreign Application Priority Data

May 19, 1983 [JP] Japan .................................. 58-86672
May 19, 1983 [JP] Japan .................................. 58-86673
May 19, 1983 [JP] Japan .................................. 58-86674

[51] Int. Cl.$^4$ ............................................. F02P 5/04
[52] U.S. Cl. ..................................... 123/417; 123/418; 123/425
[58] Field of Search ............. 123/417, 418, 425, 40 B, 123/414

[56] References Cited

U.S. PATENT DOCUMENTS

| | | | |
|---|---|---|---|
| 4,414,946 | 11/1983 | Daumer et al. | 123/417 |
| 4,487,184 | 12/1984 | Boning et al. | 123/418 |
| 4,502,442 | 3/1985 | Takakuwa et al. | 123/417 |
| 4,517,944 | 5/1985 | Inoue et al. | 123/417 |
| 4,543,634 | 9/1985 | Kobayashi et al. | 123/417 |
| 4,596,217 | 6/1986 | Bonitz et al. | 123/417 |
| 4,601,272 | 7/1986 | Nagai | 123/417 |
| 4,606,315 | 8/1986 | Tobinaga et al. | 123/417 |
| 4,676,212 | 6/1987 | Kashiwura et al. | 123/417 |

*Primary Examiner*—Raymond A. Nelli
*Attorney, Agent, or Firm*—Reising, Ethington, Barnard, Perry & Milton

[57] ABSTRACT

An ignition control system for an internal combustion engine which includes a microcomputer which operates to control the ignition timing in response to engine speed and engine temperature signals individually and in preselected combinations with an engine throttle or air flow signal during predetermined engine running conditions. These predetermined running conditions include low speed, warm up, overheat, cruising, and overspeed engine running conditions. The ignition control system is also capable of detecting and responding to abnormal combustion running conditions and setting an optimum spark advance during the starting of the engine.

4 Claims, 8 Drawing Sheets

IGNITION CONTROL SYSTEM FOR AN INTERNAL COMBUSTION ENGINE

This application is a continuation of application Ser. No. 945,185 filed Dec. 23, 1986, now abandoned, which is continuation of application Ser. No. 842.821 filed Mar. 24, 1986, now abandoned, which is a divisional of application Ser. No. 611,846 filed May 18, 1984, now U.S. Pat. No. 4,606,315 granted Aug. 19, 1986.

BACKGROUND OF THE INVENTION

This invention relates generally to electronically controlled ignition systems for internal combustion engines, and in particular to an ignition control system which is adapted to control the spark timing of the engine over a variety of engine running conditions.

Internal combustion engines have conventionally embodied mechanically operated spark advance mechanisms for controlling the spark advance in relation to throttle valve opening. Normally, the arrangement embodies a movably supported sensing device that is positioned in proximity to the engine crankcase and which generates a signal in response to the crankshaft rotation for initiating spark timing. Either the sensing device or some other associated component is rotated relative to a fixed component of the engine so as to change the spark timing. Normally, the spark timing is such that the spark is advanced to a predetermined angle at a given throttle valve opening and then is held at that angle. However, actual spark advance timing requirements are dependent upon other conditions than throttle openings and the previously proposed mechanically operated devices have not been able to produce the desired spark timing under all running conditions.

Electronically controlled ignition systems have also been proposed for controlling the spark timing electronically. Although such devices generally afford greater latitude in the timing control and the number of conditions which they are responsive to, the previously proposed systems have not been fully effective under all running conditions. One prior system which is principally directed to electronically advancing the spark timing is disclosed in the assignee's copending U.S. Pat. application Ser. No. 525,316, entitled "Electronically Controlled Ignition Angle Advancing Device For Internal Combustion Engines", filed on Aug. 22, 1983, to Gohara, et al. This patent application is hereby incorporated by reference.

It is therefore a principal object of the present invention to provide an improved ignition control system for an internal combustion engine and an improved method for electronically controlling the spark timing over a wide range of engine operating conditions.

It is another object of the present invention to provide an ignition control system which not only can advance and retard the spark timing, but is also capable of causing controlled engine misfires under the appropriate engine operating conditions.

It is a further object of the present invention to provide an ignition control system in which the spark timing is selectively a function of the engine temperature, the engine speed and the air flow to this engine induction system.

It is an additional object of the present invention to provide an ignition control system which is selectively responsive to abnormal combustion running conditions so as to assure smooth engine operation.

It is yet another object of the present invention to provide an ignition control device which is capable of suppressing an overheat running condition of the engine by automatically and gradually reducing the speed of the engine.

SUMMARY OF THE INVENTION

In order to achieve the foregoing objects, the present invention provides an ignition control device which generally includes means for providing a speed signal indicative of the speed of the engine, means for providing a flow signal indicative of the air flow to the induction system of the engine, and means for providing a temperature signal indicative of the temperature of the engine. Ignition timing means is then provided for generating a spark timing signal in response to the speed and temperature signals individual and in preselected combinations with the flow signal during predetermined running conditions of the engine. These predetermined running conditions include, for example, low speed, warm up, overheat, cruising, and overspeed engine running conditions. The ignition control system also includes means for detecting the crank angle of the engine, and means for generating an ignition signal in response to the crank angle detecting means and the spark timing signal during the running of the engine. The ignition signal generating means also includes means for generating an ignition signal having a predetermined advance during the starting of the engine.

In accordance with another feature of the present invention, the ignition control system as set forth in the preceding paragraph is generally responsive to the speed and flow signals to provide for an optimum spark timing. However, when predetermined temperature and speed ranges are exceeded or an abnormal combustion running condition determined to exist, then the ignition control system will respond to the specific engine running condition to provide an appropriate spark timing which will compensate for this running condition.

Thus, one feature of the present invention is the capability of detecting and responding to an overheat running condition by a method that will initiate a misfire mode which is effective to cause a gradual decrease in the speed of the engine. However, this misfire mode is preferably initiated only if both the speed and flow signals have exceeded individual predetermined threshold values. The misfire mode is subsequently discontinued when the flow signal has decreased below its predetermined threshold value.

In accordance with another feature of the ignition control system as set forth in the first paragraph of this summary, means for sensing and determining the presence of an abnormal combustion running condition is also included in the ignition control system. With such a provision, the ignition control system has the capability of responding to an abnormal combustion running condition by a method that will vary the spark timing signal in a predetermined sequence when both the speed and flow signals have exceeded individual predetermined threshold values. This predetermined sequence includes the steps of retarding the spark timing signal in predetermined increments over predetermined time intervals until the abnormal combustion running condition no longer exists, and then readvancing the spark timing signal in a reverse order of the predetermined increments over the predetermined time intervals.

Yet additional features of the present invention are adapted to be embodied in the ignition control system as set forth in the first paragraph of this Summary. One such feature is the capability of detecting and responding to a low speed running condition by providing a spark timing signal having a predetermined advance and holding this spark timing signal at this advance for a predetermined number of crankshaft rotations. Another feature is the capability of detecting and responding to an overspeed running condition by intermittently interrupting the transmission of the ignition signal. A further feature is the capability of detecting and responding to an undesirable reverse running condition by causing a misfire mode for all of the cylinders of the engine.

Additional advantages and features of the present invention will become apparent from a reading of the detailed description of the preferred embodiments which makes reference to the following set of drawings in which:

DETAILED DESCRIPTION OF THE PREFERRED EMBODIMENT

Figure 1:
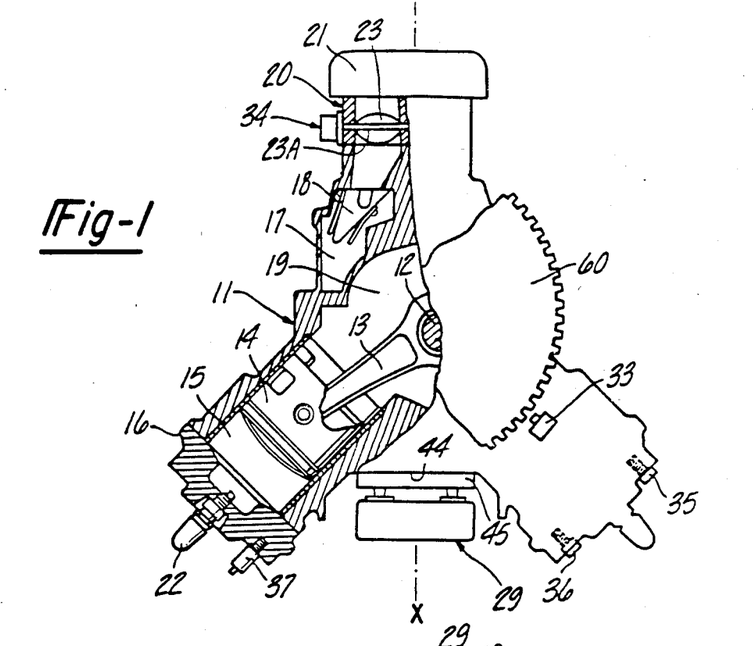
FIG. 1 is an end elevation view, with portions broken away, of an engine for an outboard motor having an ignition system constructed in accordance with an embodiment of the invention and operating in accordance with a method of the invention.
Figure 2:
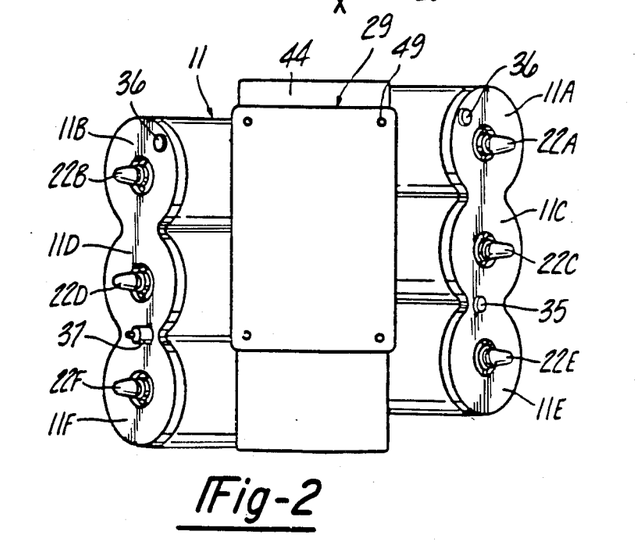
FIG. 2 is a front elevation view of a portion of the outboard motor engine shown in FIG. 1.

Referring first to FIGS. 1 and 2 of the drawings, an engine 11 for an outboard motor is shown which has six cylinders in two rows that are arranged in the form of a "V" at a 90° bank angle. More specifically, a first cylinder 11A and a second cylinder 11B are arranged to have V-like form in combination. Similarly, the third cylinder 11C and the fourth cylinder 11D, and a fifth cylinder 11E and a sixth cylinder 11F are arranged, respectively, to provide V-like forms. The engine 11 has a vertical crankshaft 12 to which pistons 14 are connected through connecting rods 13, such that the pistons are supported for reciprocation in their respective horizontal cylinders. Cylinder heads 16 are fixed to their respective cylinders 11A–11F to form combustion chambers 15. Spark plugs 22A–22F are positioned in the cylinder heads 16, there being one spark plug for each cylinder of the engine.

The engine 11 is of the two-cycle, crankcase compression type and is provided with an induction system that supplies a fuel/air mixture to sealed crankcase chambers 19, each associated with a respective one of the cylinders. The induction system includes an air intake device 21 that supplies air to a carburetor 20. The carburetor 20 has a throttle valve 23 associated with each crankcase chamber 19 or with pairs of such chambers 19, as is well known in this art. A reed type check valve 18 is positioned in each carburetor induction passage or in the intake manifold downstream of the throttle valve 23 for controlling the flow to a manifold passage 17 which, in turn, communicates with the respective crankcase chamber 19.

While the engine 11 is shown as a two-cycle V6 engine for an outboard motor, it will become readily apparent to those skilled in the art that the invention may be susceptible for use with other types of internal combustion engines and engines having other number of cylinders, even to an engine having only one cylinder.

Figure 3:
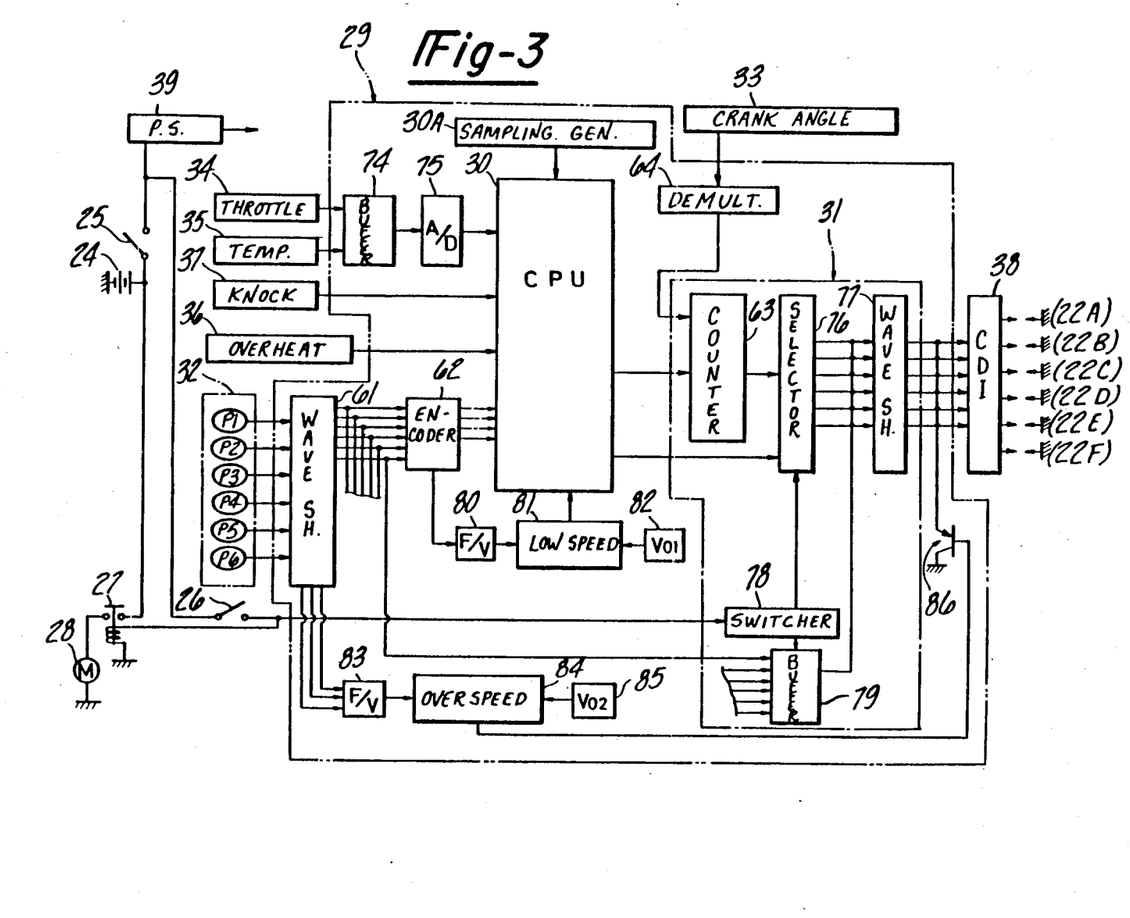
FIG. 3 is a block diagram of the ignition system and particularly of the ignition control system shown in FIG. 1.

FIGS. 1 and 2 also show that the engine is provided with an electronic ignition controller 29 in accordance with the present invention. A block diagram of the controller 29 is shown in FIG. 3. The controller 29 operates in response to the closing of a power switch 25 which is connected to a battery 24. A starter switch 26 is also provided for energizing a relay 27 which will cause a starter motor 28 to start the engine 11.

The heart of the controller 29 is a microcomputer (CPU) which provides an ignition timing means 30 for generating a spark timing signal. This spark timing signal controls the time at which an ignition signal is transmitted by the ignition signal generator 31. The ignition timing means 30 has been programmed to be selectively responsive to a variety of input signals. These input signals are derived from five different detectors, namely pulser coils 22, throttle valve opening detector 34, temperature detector 35, overheat detector 36, and an abnormal combustion or knock detector 37.

As will be more fully described below, a speed signal indicative of the speed of the engine 11 is derived from the pulser coils 32, and a flow signal indicative of the air flow to the induction system of the engine is derived from the throttle valve opening detector 34. Similarly, a temperature signal indicative of the temperature of the engine 11 is derived from both the temperature detector 35 and the overheat detector 36. While it is preferred that separate detectors be used for the temperature detector 35 and the overheat detector 36, it should be understood that a single detector could be employed in the appropriate application. As will be appreciated from the description below, the ignition timing means is responsive to the speed and temperature/overheat signals individually and in certain combinations with the flow signal during various running conditions of the engine 11.

A crank angle signal generator 33 is also provided, which together with the pulser coils 32 enables the controller 29 to determine the rotational position of the crankshaft 12. This information is then utilized by the ignition signal generator 31 to synchronize the timing of the ignition signal with the rotation of the crankshaft 12. As illustrated in FIG. 3, a separate ignition signal is generated for each of the six cylinders of the engine 11. These ignition signals are transmitted to a capacitive discharge ignition (CDI) circuit or unit 38 which is operative to fire the spark plugs 22A–22F in response to the appropriate ignition signal. The CDI circuit 38 may be of any conventional design, such as illustrated in FIG. 4 of the Gohara, et al patent application referred to above.

The controller 29 is also provided with a sampling period generator 30A to provide a timing signal input to the ignition timing means 30. Additionally, a power supply or regulator circuit 39 is connected to the battery 24 through the power switch 25 to drive each of the circuits included in the controller 29.

Figure 4:
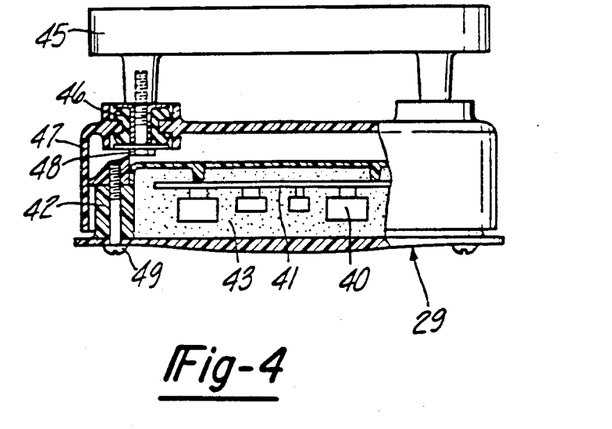
FIG. 4 is an enlarged partial end elevation view, with portions broken away, of the ignition control system shown in FIG. 1.

As will be seen from FIG. 4, the controller 29 has a multiplicity of elements or electronic parts arranged on a circuit board or substrate 41 and accommodated by a case 42. These elements are held within the case 42 while being enveloped by a resin filler 43 formed by the resin filling the space in the case 42. The controller 29 has its major plane containing the substrate 41 disposed substantially perpendicularly to the principal direction of the vibration taking place in the engine, i.e. to the direction shown by line X—X in FIG. 1. Accordingly, a mounting base 45 is secured to the central portion of the engine having cylinders arranged in a form like V. A box-shaped mounting bracket 47 is secured to the mounting base 45 through an intermediary of a rubber damper 46 by means of screws 47. The controller 29 is secured to the mounting bracket 47 by means of screws 49 such that the substrate 41 extends perpendicularly to the axis of the engine 11.

Figure 5:
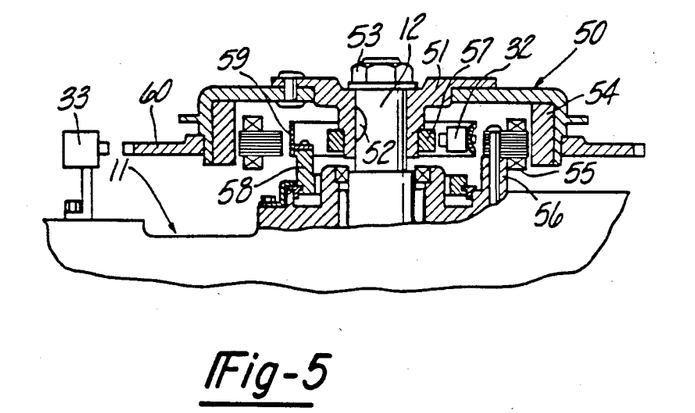
FIG. 5 is an enlarged partial end elevation view, with portions broken away, of the outboard motor engine shown in FIG. 1, particularly illustrating the power and pulse generating means of the ignition system.

Referring to FIG. 5, a flywheel assembly is shown, which also forms a portion of a magneto generator. A rotor 50 is fixed at its base 51 to the upper end of the crankshaft 12 of the engine 11 by means of a semi-circular key 52 and a nut 53. A permanent magnet 54 is attached to the inner surface of the rotor 50. A reference numeral 55 designates a power generating coil. A plurality of coils 55 are arranged so as to oppose to the inner surface of the permanent magnet 54, and are fixed to legs 56 provided on the engine 11.

A reference numeral 57 denotes an annular permanent magnet having a north pole "N" and a south pole "S" which are arranged at 180° intervals so as to diametrically oppose to each other around the base 51 of the rotor 50. The engine 11 has three pulser coils 32A, 32B and 32C which are arranged at 120° intervals and secured to the inner surface of an annular holder 59. The annular holder 59 is in turn secured to support base 58 which is supported by the engine 11. The arrangement is such that one of three pulser coils 32A, 32B and 32C generates a pulse (i.e., $P_1$–$P_6$) at each 60° rotation of the crankshaft 12. As will be seen from FIG. 6, pulses $P_1$ and $P_2$ (corresponding to the first and the fourth cylinders 11A and 11D) are generated in the (corresponding to the second and fifth cylinders 11B and 11E). Similarly, pulses $P_3$ and $P_6$ (corresponding to the third and sixth cylinders 11C and 11F) are generated in the pulser coil 32C. The timing at which the pulses $P_1$ to $P_6$ are produced is fixed to positions which are advanced from the top dead centers TDC of respective cylinders by starting ignition timing angles $\theta_0$, e.g. by angle $\theta_0$ before top dead center (DBTDC).

A ring gear 60 adapted to receive the torque of the starter motor 28 at the time of start up of the engine is fixed to the outer periphery of the rotor 50. The crank angle signal generator 33 is stationarily mounted on the engine 11 in a position which opposes the outer peripheral portion of the ring gear 60. The arrangement is such that, as the crankshaft 12 rotates, pulses corresponding to the teeth of the ring gear 60 are generated by the crank angle signal generator 33.

The output pulses from the pulser coils 32 are encoded by an encoder 62 through a wave shaping circuit 61 of the controller 29 as shown in FIG. 3. These output pulses are successively transmitted in a form distinguishable from one another to the preset counters 63 through the ignition timing setting means 30. On the other hand, the output pulses from the crank angle signal generator 33 are divided into pulses of small width shown by Pc in FIG. 7 by a demultiplier circuit 64.

The pulser coils 32, the crank angle signal generator 33 and the preset counter 63 constitute a crank angle detector in accordance with the invention. The pulser coils 32 produce, with each rotation of the crankshaft 12, the pulses corresponding in number to the number of engine cylinders, at predetermined angular positions of the crankshaft 12. Therefore, the pulser coils 32 function as the reference angle signal generator for the crankshaft 12, so that the angular position of the crankshaft 12 can be detected by counting the number of pulses issued by the crank angle signal generator 33 after the moment at which a pulse is generated by a pulser coil 32.

Figures 6, 7:
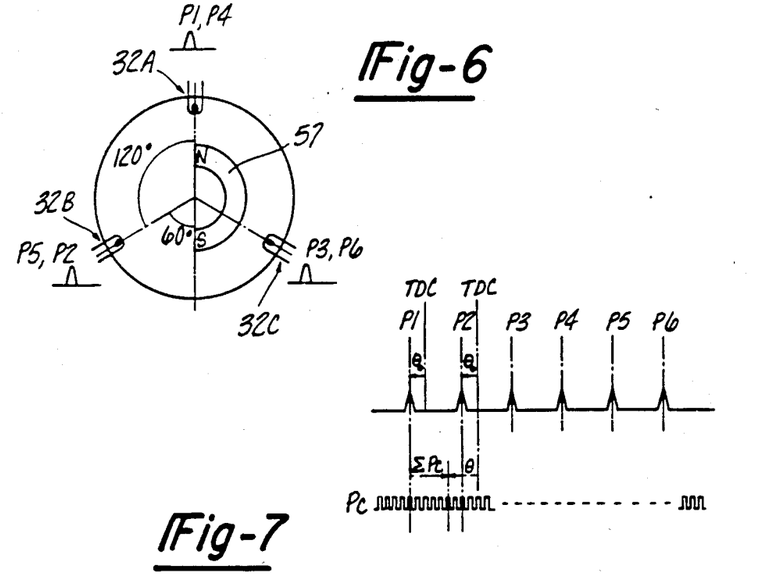
FIG. 6 is a graphical illustration of the magnet and coil construction for the pulse generating means of the ignition system shown in FIG. 5.
FIG. 7 is a graph of the pulse outputs from the pulse generating means in relation to the pulse produced by the crank angle signal generator shown in FIGS. 1 and 5.

The detection of the angular position of the crankshaft 12 may be made in a manner explained hereinunder with reference to FIG. 7. Pulse $P_1$ from the pulser coil 32A represents a reference angle signal for the first engine cylinder 11A. Pulse $P_1$ occurs at a fixed advance angle $\theta_0$ before the top dead center (TDC) of the piston 14 in the cylinder 11A. When the pulse $P_1$ is generated, the pulses $P_c$ produced by the crankshaft angle signal generator 33 are counted by a preset counter 63 in the ignition signal generator 31. Accordingly, the crank position is determined over an angular range of only 60°$\theta$ in the six cylinder engine 11, since a new pulse is generated by the pulser coils 32 every 60° of the crankshaft rotation. With this arrangement, it should be appreciated that the rotational position of the crankshaft can be determined with high precision by counting a relatively small number of pulses.

The pulser coils 32 also function as an engine speed sensor for the controller 29. Namely, the pulser coils 32 produce pulses of a number corresponding to the number of cylinders in one full rotation of the crankshaft 12. It is, therefore, possible to detect the revolution speed of the crankshaft 12, i.e. the engine speed, by counting the pulses produced by the pulser coil 32 in a unit time.

Figure 8:
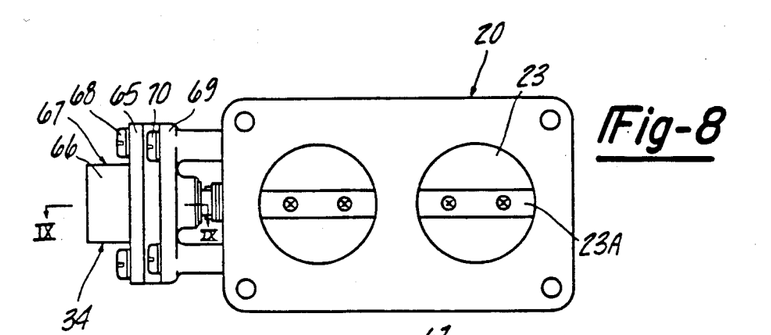
FIG. 8 is an enlarged end elevation view of the throttle opening detector and carburetor shown in FIG. 1.
Figure 9:
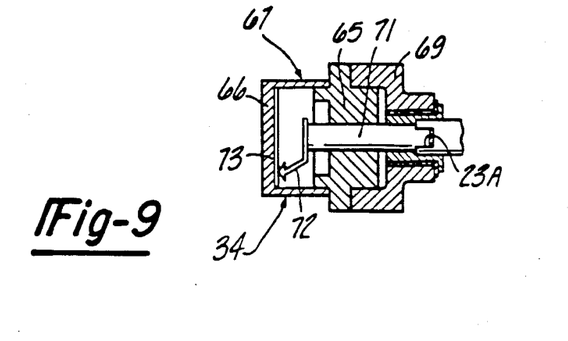
FIG. 9 is a cross-sectional view of the throttle opening detector taken along lines IX—IX of FIG. 8.

As will be seen from FIGS. 8 and 9, the throttle opening detector 34 has a housing 67 constituted by a base portion 65 and a cap portion 66. The housing 67 is secured to a mounting bracket 69 by means of screws 68, while the mounting brackets 69 are fixed to the body of the carburetor 20 by means of a screw 70. A contact 72 is fixed to the detection shaft 71 of the throttle opening detector 34. As the detection shaft 71 rotates, the contact 72 moves in sliding contact with the resistance plate 73 so that the contact 72 and the resistance plate 73 in combination constitutes a potentiometer type transmitter. Namely, the opening degree of the throttle valve, i.e. the intake air flow rate to the cylinders of the engine is detected in accordance with the position of sliding contact between the contact 72 and the resistance plate 73. In this throttle opening detector 34, the detection shaft 71 is connected directly to the throttle shaft 23A. Namely, in this throttle opening detector 34, both of the housing 67 and the detection shaft 71 thereof are connected to the carburetor 20. Therefore, the housing 67 and the detection shaft 71 vibrate always in the same vibration mode regardless of the vibration of the housing 67. Thus, relative movement between the housing 67 and the detection shaft 71 due to vibration is eliminated to avoid operation failure of the detector 34 attributable to the vibration. The primary direction of the vibration of the engine 11 coincides with the axis of the engine indicated by the line X—X shown in FIG. 1. This throttle opening detector 34, therefore, is arranged such that the direction of axis of the detection shaft 71, which is less resistant to the vibration, i.e. the direction of contact between the contact 72 and the resistance plate 73, is substantially perpendicular to the primary direction of vibration occurring in the engine 11, so that the detector 34 is protected from the vibration as its contact 72 rotates. Rather than employ a device that is responsive to the position of the throttle valve 23, an actual air flow sensing device of any known type, such as a hot wire anomometer, may be positioned directly in the induction system.

The temperature detector 35 is constituted by, for example, a thermistor and is connected to a portion of the cylinder head 16 between the third cylinder 11C and the fifth cylinder 11E, so as to detect the temperature of the engine 11 by way of the temperature of cooling water. However, it should be appreciated that the temperature detector 35 could alternatively be positioned so as to sense the temperature of some other component of the engine. The results of detection by the throttle detector 34 and the temperature detector 35 are alternatingly transmitted to the analog to digital (A/D) converter 75 through a buffer 74. These results are then digitized in the A/D converter 75 and then transmitted to the ignition timing means 30.

On the other hand, the overheat detector 36 is made of a temperature-sensitive switch of bimetal contact type, and is secured to the cylinder head of each of the first cylinder 11A and the second cylinder 11B. The overheat detector 36 detects the temperature of the cooling water in the cylinder head 16 and permits the transmission of the detected temperature above a predetermined threshold value to the ignition timing means 30.

The knock detector 37 is of a vibration detection type employing a piezoelectric element or a magnetic strain type, and is secured to the portion of the cylinder head 16 between the fourth cylinder 11D and the sixth cylinder 11F. The knock detector 37 is adapted to detect vibration in the engine exceeding a predetermined level to find any abnormal combustion such as knocking, pre-ignition and so forth (referred to as "knock", hereinunder) and permits the transmission of the detection result to an ignition timing means 30. Alternatively, the knock detector 37 may actually sense actual pressure in the combustion chamber. As is well known, the pressure in the combustion chamber during knocking conditions is considerably higher than during normal combustion conditions. Alternatively, the knock detector 37 may sense other abnormal combustion conditions as a preignition or run-on, all of which are related to some extent to knocking although caused by slightly different conditions. In each case, the condition is sensed by the provision of a vibration or frequency that is considerably higher than that that occurs during normal combustion.

An explanation will now be made as to the practical procedure for the control of the ignition performed by the controller 29. Referring first to the operation of the controller 29 in the normal state of engine, the ignition timing means 30 of the controller 29 beforehand stores in a suitable memory the optimum ignition timings with the parameters of the engine speed and the throttle opening as the intake air flow rate, in the form of a map or a function. An example of such a map stored in the ignition timing means 30 has been disclosed in the specification and drawings of the Gohara, et al., patent application referred to above. Therefore, in the normal state of operation of the engine 11, the ignition timing means 30 sets the ignition timing optimumly for the present state of engine operation from the above-mentioned map, in accordance with the engine speed which is obtained through counting of the output pulses from the pulser coils 32 and the throttle opening, i.e. the intake air flow rate, detected by the throttle opening detector 34. The thus determined optimum ignition timings are delivered to the preset counters 63 of the ignition signal generators 31 of respective cylinders.

On the other hand, the preset counters 63 constitute a part of the crank angle detector which detects the angular position of the crankshaft 12 by counting the number of pulses generated in the crank angle signal generator 33 after the generation of the pulses from one of the pulser coils 32.

A preset counter 63 as a part of the ignition signal generator 31 delivers an ignition signal to the selector circuit 76 at a moment which the crank angle thus counted reaches the optimum ignition timing delivered by the ignition timing means 30. The selector circuit 76 receives a cylinder identification signal directly from the ignition timing means 30 concurrently with the ignition signal from the preset counter 63. The ignition signal thus transmitted to the selector 76 is delivered to the CDI circuit 38 for the appropriate cylinder through a wave shaping circuit 77.

The operation of each CDI ignition means in the circuit 38 will now be described. After commencing the charge of the ignition capacitor by a voltage generated by the power generating coil 55 of the magnet, the gate of a silicon controlled rectifier (SCR) is made to conduct by the ignition signal current generated in the ignition signal generator 31. At the same time, the electrostatic charge stored in the ignition capacitor is rapidly applied to the primary side of an ignition coil, thereby producing at the secondary side of this coil a high voltage by which the spark plugs 22A to 22F of respective cylinders are caused to discharge. Thus, according to the advance angle control performed by the controller 29, the optimum ignition timing is read from a map stored in the ignition timing means 30 so that the ignitions in respective cylinders are made at predetermined optimum times.

Figure 10:
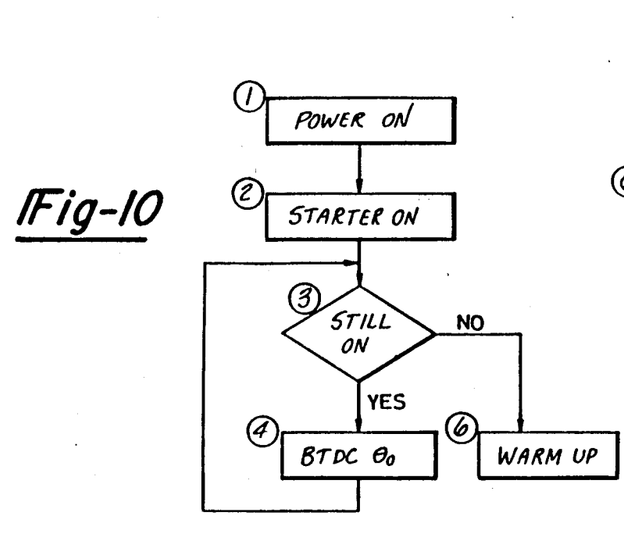
FIG. 10 is a flow chart illustrating the operation of the ignition control system for the starting of the outboard motor.

An explanation will be made of the start up control performed by the controller 29. This start up control is performed by a start-up program shown in FIG. 10 which is written into and stored in the controller 29. After the closing of the power supply switch 25 in a step (1), as the starter switch 26 is closed in a step (2), a judgment is made in a step (3) as to whether the closed state of the starter switch 26 is maintained. If the answer is YES in the step (3), the operation of the selector circuit 76 is stopped by the operation of the changeover circuit 78 and a buffer 79 is started, so that the output from the wave shaping circuit 61, i.e. the output signal which is fixed at a starting ignition timing, (e.g. at $BTDC\theta_0$), is transmitted to the wave shaping circuit 77, thereby to control the CDI circuit 38 through the wave shaping circuit 77 such that the ignition takes place at $BTDC\theta_0$. This operation is conducted in a step (4). Then, the process returns to step (3) again. In the event that the answer is NO in the step (3), the operation of the buffer 79 is stopped by the change-over circuit 78, while the selector circuit 76 is made to operate to make the ignition timing means 30 to operate such that the CDI unit 38 effects an ignition at the optimum ignition timing which is in this case determined in accordance with the output from the temperature detector 35. This operation is made in a step (6).

According to the start control performed by the controller 29, the ignition during the start up of the engine takes place at the timing optimum for the start up, so that the start up of the engine is automatically facilitated to insure a good start up of the engine.

Figure 11:
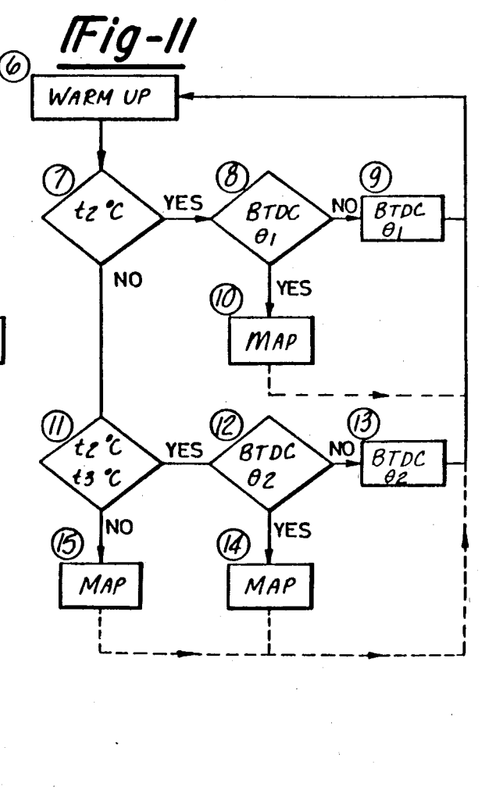
FIG. 11 is a flow chart which continues the flow chart of FIG. 10, and which illustrates the operation of the ignition control system for a warm up running condition.
Figure 12:
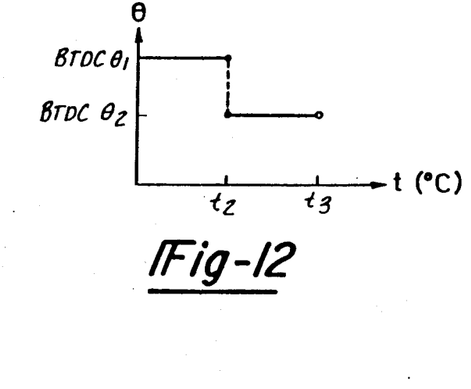
FIG. 12 is a graph of the spark timing as a function of temperature during the warm up running condition.

An explanation will be made hereinunder as to the warm-up control performed by the controller 29 in connection with FIG. 11. This control is conducted in accordance with the warming program stored in the controller 29 after the start up of the engine 11 by the start-up control described above. The ignition timing means 30 beforehand stores the warm-up ignition timing chart shown in FIG. 12, in which the axis of abscissa represents engine temperature "t" while the axis of ordinate represents the advance angle $\theta$. Thus, when the engine is being warmed up after the start-up and the engine temperature is still below a temperature $t_2°$ C. the optimum ignition timing is set at $BTDC\theta_1$. Similarly, while the engine temperature is above $t_2°$ C. and below $t_3°$ C. the optimum ignition timing is selected to be, for example, $BTDC\theta_2$.

Thus, the controller 29 delivers the output of the temperature detector 35 to the ignition timing means 30 as described before in a step (6), and the ignition timing means makes a judgment as to whether the result of detection is below $t_2°$ C. in a step (7). If the answer in the step (7) is YES, a judgment is made in a step (8) as to whether the advance angle on the map under the present operating condition of engine is greater than $BTDC\theta_1$ in a step (8). If the answer in the step (8) is NO, the ignition timing means 30 selects the angle $BTDC\theta_1$ as the optimum ignition timing, so that the CDI circuit 38 is controlled through the ignition signal generator 31 to effect the ignition at this timing in a step (9). Then, the process returns again to the step (6). In the case where the result of the judgment made in the step (8) is YES, the ignition timing means 30 preferentially sets the advance angle in accordance with the map as the optimum ignition timing, and controls the CDI circuit or unit 38 through the ignition signal generator 31 to effect the ignition at this timing in a step (10).

In the event that the result of judgment in a step (7) is no, a judgment is made in a step (11) as to whether the result of detection by the temperature detector 35 is below $t_3°$ C. If the answer in the step (11) is YES, a judgment is made as to whether the advance angle on the map under this operating condition is greater than $BTDC\theta_2$ in a step (12). When the answer obtained in the step (12) is NO, the ignition timing means 30 selects the $BTDC\theta_2$ as the optimum ignition timing and controls the CDI unit 38 through the ignition signal generator 31 to effect the ignition at this timing in a step (13). The process then returns to the step (6). If the result of judgment in the step (12) is YES, the ignition timing means 30 preferentially selects the advance angle on the map as the optimum ignition timing and controls the CDI unit 38 through the ignition signal generator 31 to effect the ignition at this timing in a step (14). To the contrary, if the answer obtained in the step (11) is NO, the ignition timing means 30 selects the advance angle on the map as the optimum ignition timing, thereby to control the CDI unit 38 through the ignition signal generator 31 to effect the ignition at this timing in a step (15).

After the ignition control effected in the steps (10), (14) and (15), the process again returns to the step (6) so that the same control program is executed repeatedly.

In the steps (8) and (12) of the warm-up control, when the advance angle on the map is greater than the advance angle in accordance with the warm-up characteristics, the advance angle located on the map is used preferentially. There are two reasons for such preference. The first reason is that, from the viewpoint of warm-up control, the greater advance angle is preferred. The second reason is to avoid a significant reduction in the advance angle at this time which could cause a significant decrease in the speed of the engine.

According to the warm-up control performed by the controller 29, it becomes possible to effect an automatic control of the ignition timing during warming up of the engine after the start up of the same such that the ignition is conducted at the timing optimum for the warming up of the engine without being accompanied by inadequate warming time and degradation in the fuel consumption. It is thus possible to facilitate the warming up of the engine and to make sure of the warming effect to stabilize the engine operation during the warming up of the engine.

Figure 13:
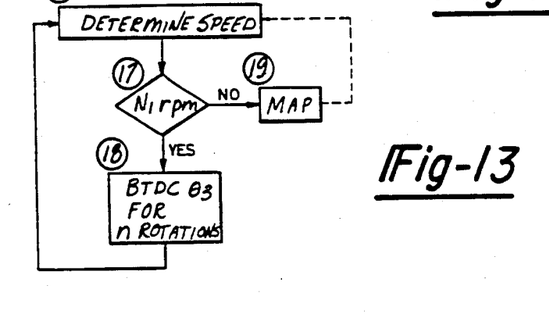
FIG. 13 is a flow chart illustrating the operation of the ignition control system for a low speed running condition.

An explanation will be made hereinunder as to the low speed control performed by the controller 29 during idling and trawling. The low speed control is made in accordance with a low speed program as shown in FIG. 13 stored in the controller 29. When the engine speed is lower than a predetermined low speed such as $N_1$ rpm, the advance angle BTDC$\theta_3$ is used as the optimum ignition timing. This advance angle is held or maintained by the ignition timing means 30 until crankshaft 12 makes "n" rotations. More specifically, the controller 29 is adapted to process the frequency of the output pulse from the pulser coils 32 by a frequency to voltage (F/V) converter 80 and produce an output voltage corresponding to the engine speed in a step (16). Then, in a step (17), a judgment is made by a low speed comparator circuit 81 as to whether the output voltage from the F/V converter 80 is below a reference voltage $V_{01}$ corresponding to the engine speed $N_1$ rpm as set in a voltage setting means 82. If the answer in the step (17) is YES, the ignition timing means 30 holds BTDC$\theta_3$ as the optimum ignition timing for a period corresponding to "n" rotations of the crankshaft 12 and controls the CDI unit 38 through the ignition signal generator 31 to effect the ignition at this timing in a step (18). The process then returns to the step (16). To the contrary, when the answer of the judgment made in the step (17) is NO, the ignition timing means 30 sets the advance angle located on the map as the optimum ignition timing and controls the CDI unit 38 through the ignition signal generator 31 to effect the ignition control in the step (19). The controller 29 then operates to return the process to the step (16) to execute this control program repeatedly.

In the low speed control explained hereinunder, the advance angle BTDC$\theta_3$ is maintained for the period corresponding to "n" rotations of the crankshaft, in order to avoid unnecessary speed-up of the engine 11 while effecting a smooth speed control.

According to this low speed control performed by the controller 29, when the speed of the engine 11 is increased to the preselected low speed, the ignition angle is automatically put ahead to permit the acceleration of the engine to avoid any stall of the engine. By repeating this operation, it is possible to stabilize the engine operation at this low speed. Namely, when the outboard engine 11 is operated in an idling or trawling mode, it is possible to stabilize the engine operation at the desired low speed with a small fuel consumption and low level of noise. For this reason, it becomes possible to keep the boat at a constant position against movement by the tide.

Figure 14:
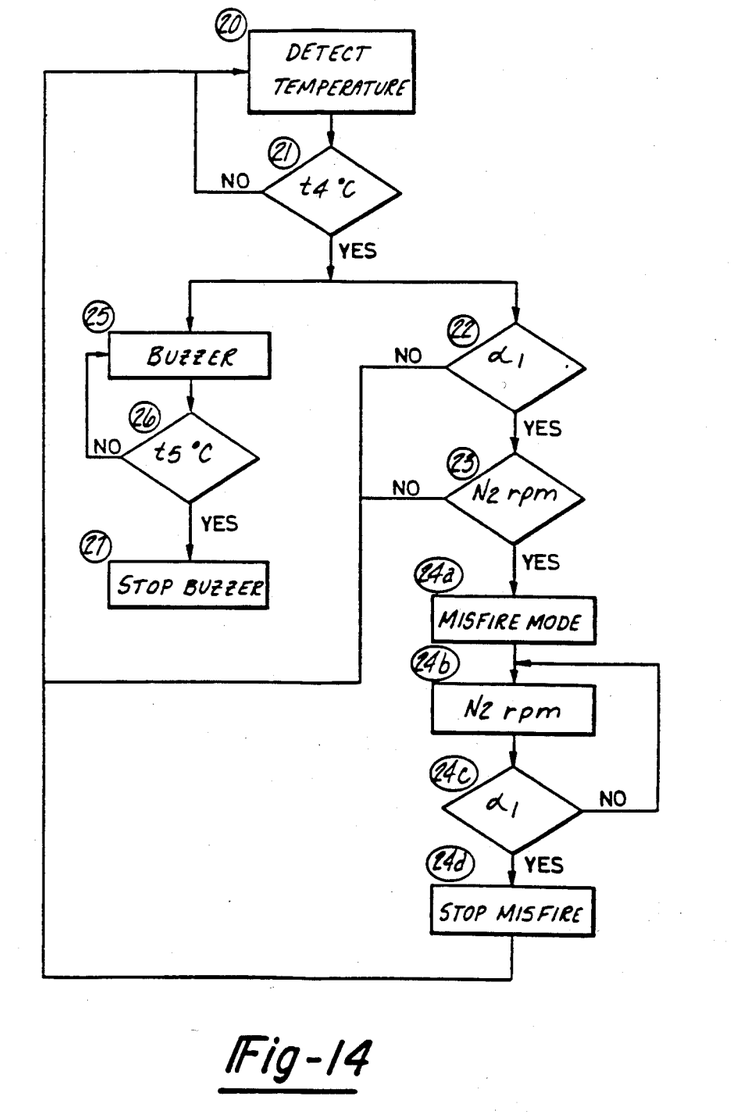
FIG. 14 is a flow chart illustrating the operation of the ignition control system for an overheat running condition.
Figures 15, 16:
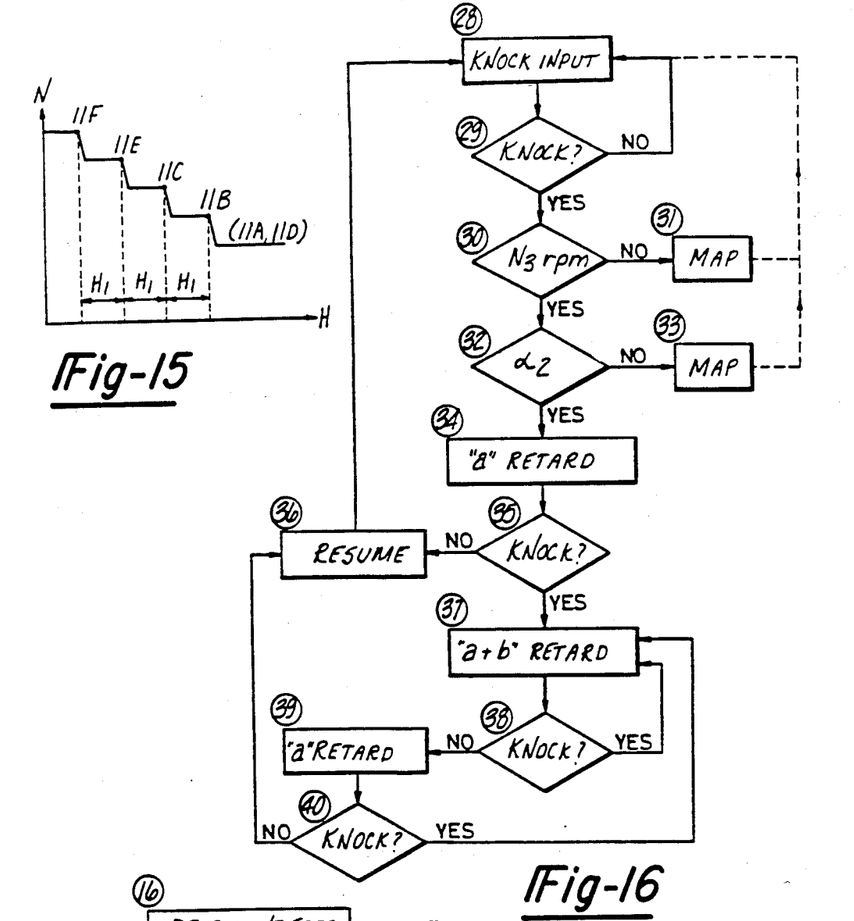
FIG. 15 is a graph of the engine speed as a function of time during an overheat running condition.
FIG. 16 is a flow chart illustrating the operation of the ignition control system for an abnormal combustion running condition.

An explanation will be made hereinunder as to the overheat suppression control method performed by the controller 29. This overheat suppression control is performed by an overheat suppressing program shown in FIG. 14 and stored in the controller 29. When the engine temperature is higher than the predetermined temperature $t_4°$ C., and the throttle opening is greater than a predetermined opening such as $\alpha_1$, and the engine speed is greater than a predetermined speed such as $N_2$ rpm, the ignition timing means 30 operates to successively bring some of the cylinders of the engine into a misfiring mode one by one at a predetermined time interval. This is achieved by preventing the ignition timing signals for such cylinders from being transmitted to the ignition signal generator 31. FIG. 15 shows a diagram illustrating how the overheat control method is conducted, in which the axis of abscissa represents time H while the axis of ordinate indicates the engine speed N. Namely, in this embodiment, in the engine 11 having six cylinders 11A to 11F, the sixth cylinder 11F, fifth cylinder 11E, third cylinder 11C and the second cylinder 11B are successively brought into misfiring operation at a time interval $H_1$ which ranges between $h_1$ seconds and $h_2$ seconds, so that the engine finally operates with two cylinders, i.e., the first cylinder 11A and the fourth cylinder 11D.

Thus, in this overheat suppressing control method, the controller 29 is adapted to deliver, in a step (20) the engine temperature detected by the overheat detector 36, i.e. the temperature sensitive switch, to the ignition timing means 30. Then, in a step (21), a judgment is made as to whether the detection result exceeds $t_4°$ C. If the result of the judgment made in the step (21) is NO, the process returns to the step (20). If the result is YES, a judgment is made as to whether the throttle opening detected by the throttle detector 34 is greater than $\alpha_1$. If the result of judgment in the step (22) is NO, the process is returned to the step (20). However, if the result of judgment is YES, a judgment is made as to whether the engine speed measured by counting the output pulses from the pulser coils 32 is higher than $N_2$ rpm in a step (23). Then, if the result of the judgment in the step (23) is NO, the step (23) is performed repeatedly. However, if the result of the judgment is YES, the ignition timing means 30 executes a mis-firing control shown in FIG. 15 in a step (24a) and holds the engine speed at $N_2$ rpm in a step (24b). Thereafter, a judgment is made as to whether the throttle opening detected by the throttle opening detector 34 is less than $\alpha_1$ in a step (24c). If the result of judgment in the step 24c) is NO, the process returns to the step (24b) but, if the result is YES, the process is returned to the step (20) after dismissing the misfiring control in a step (24d). When the answer of the judgment in the step (21) is YES, the controller 29 operates also to start a buzzer in a step (25) to warn the operator. In the following step (26), a judgment is made as to whether the engine temperature as detected by the temperature detector 35 is below $t_5°$ C. If the answer to the judgment made in the step (26) is NO, the process is returned to the step (25) to continue the warning by the buzzer. However, if the answer is YES, the buzzer is stopped in a step (27) and the process is returned to the step (20).

In the step (24c) of the overheat control program, a judgment is made as to whether the throttle opening exceeds $\alpha_1$, for the reason explained hereinbelow. When the engine temperature has come down as a result of the misfiring control executed in the steps (24a) and (24b), the igniting condition of the engine may be reset to the normal state without notice to the driver, thereby causing an unexpected acceleration of the engine. To avoid this, the misfiring control mode is not dismissed automatically even after the lowering of the engine temperature. Rather, the misfiring control is dismissed through an intentional operation of the throttle by the operator.

On the other hand, in the step (23) of the overheat suppressing control program, the engine speed is examined because it may not be possible to maintain smooth engine operation with only two cylinders for an engine speed below $N_2$ rpm.

Thus, in the overheat suppressing control performed by the controller 29, when the engine temperature is raised to an abnormally high level, the buzzer goes off to warn the operator of the abnormal temperature rise, while the engine speed is gradually decreased in a stepped manner to prevent the overheat without stopping the engine. Thus, according to the invention, some of cylinders of an engine having three or more cylinders are successively brought into misfiring mode at a predetermined time interval and the engine finally operates only with remainder or remainders of the cylinders, so that the occurrence of the overheat of the engine is suppressed by decelerating the engine while avoiding a drastic deceleration of the engine and the stop of water cooling or air cooling which would occur with a stall of the engine.

Figure 17:
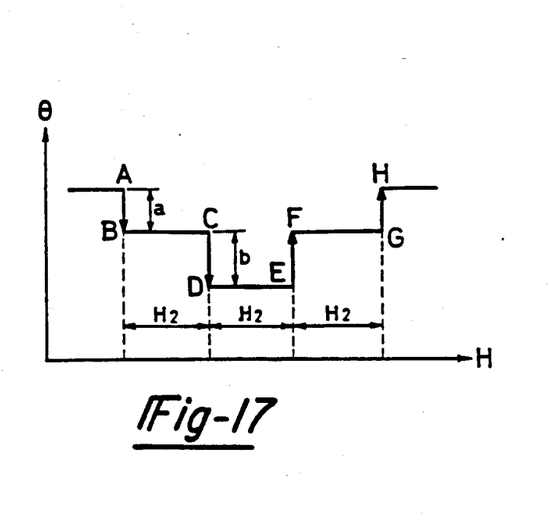
FIG. 17 is a graph illustrating the sequence of varying the spark timing as a function of time during an abnormal combustion running condition.

An explanation will now be made hereinunder as to the knock suppressing method performed by the controller 29. This knock suppression control is executed in accordance with the knock suppressing program shown in FIG. 16 and stored in the controller 29. The ignition timing means 30 in this case operates to delay the ignition timing in a stepped manner upon detection of the abnormal combustion (knock) made by the knock detector 37, and to hold the delay in each step. FIG. 17 is a diagram showing the state of setting of the ignition timing, in which the axis of abscissa represents the time H, while the axis of ordinate shows the angle $\theta$ of advance. Assuming that a knocking is detected at point A, the ignition angle is delayed by an angle "a" degree at point B and this delay is held for a predetermined period $H_2$ such as $h_3$ minutes. If the knock is found after the expiration of the period between the points B and C, the ignition timing is further delayed by "b" degrees at point D, and this delay is maintained for a period $H_2$. Thus, the amount of delay at the point D from the initial timing set at point A is expressed by (a+b) degrees. After the elapse of the period between points D and E, steps reverse to those explained above are taken to resume the initial ignition timing. If a knock is detected again in the period between points F and G, the ignition timing is delayed again by angle "b". The amount of sum of angles "a" and "b" in FIG. 17 is selected to permit sufficient suppression of the knocking.

The process for knock suppressing control is as follows. In a step (28), the controller 29 inputs the result of detection by the knock detector 37 to the ignition timing means 30 and a judgment is made in a step (29) as to whether there exists a knocking. If the result of judgment made in the step (29) is NO, the process returns to step (28). However, if the result of the judgment is YES, a judgment is made in a step (30) as to whether the engine speed, which is measured by counting the output pulses from the pulser coils 32, is higher than $N_3$ rpm. If the result of judgment made in the step (30) is NO, the ignition timing means 30 selects the advance angle read on the map as the optimum ignition timing, and controls the CDI unit 38 through the ignition timing generator 31 to effect the ignition at this timing in a step (31). If the result of judgment made in the step (30) is YES, a judgment is made in a step (32) as to whether the throttle opening detected by the throttle opening detector 34 is greater than $\alpha_2$ degree. If the answer to this judgment is NO, the ignition timing means 30 sets the advance angle located on the map as the optimum ignition timing, and controls the CDI unit 38 through the ignition signal generator 31 to effect the ignition at this timing in a step (33). To the contrary, if the result of judgment made in the step (32) is YES, the ignition timing means 30 delays the ignition timing by an angle "a" from the delayed timing which has been already obtained, and holds this delay for $h_3$ in a step (34). After the expiration of the period for holding this delay, the ignition timing means 30 makes a judgment as to whether there is a knock or not in a step (35). If the result of the judgment in the step (35) is NO, the ignition timing means 30 operates in a step (36) to resume the ignition timing which has been obtained before the delay by angle "a" made in the step (34). If the result of judgment in the step (35) is YES, the ignition timing means 30 operates to further delay the ignition timing by angle "b" in addition to the delay by angle "a" attained already in the step (34). Thus, the ignition timing is delayed by angle (a+b) from the initial position and this delay is held for $h_3$ minutes in a step (37). Then, after elapse of the period for holding the delay in the step (37), the ignition timing means 30 operates again to judge whether there exists a knock in the engine in a step (36). If the result of judgment made in a step (38) is YES, the process is returned to the step (37) in which the delay by angle (a+b) is maintained again for the period of $h_3$ minutes. To the contrary, if the result of judgment made in the step (38) is NO, the angle of delay "b" added in the step (37) is nullified so that the ignition timing resumes the delay angle "a" which is maintained for $h_3$ minutes in a step (39). After the expiration of this period for holding this delay resumed in the step (39) is expired, the ignition timing means 30 further makes a judgment as to whether there is a knock in the engine in a step (40). If the answer to this judgment made in the step (40) is NO, the ignition timing means 30 operates to resume the ignition timing which had been obtained before the delay by "a" attained in the step (39), and the process is then returned to the step (28). If the result of the answer to the judgment made in the step (40) is YES, the ignition timing means 30 adds the delay angle "b" to the existing delay angle "a" attained in the step (39), and the process is returned to the step (37) for holding this delay (a+b) for a period of $h_3$ minutes. After the ignition control made in the steps (31) and (33), the process is returned to the step (28) and the program described hereinbefore is conducted repeatedly.

In the step (30) of the knock suppressing control program explained above, a judgment is made as to whether the engine speed is higher than $N_3$ rpm, because the engine operation at a speed less than $N_3$ rpm tends to cause a stall of the engine operation and, hence, preferably be avoided. In addition, the reason why the judgment as to whether the throttle opening is greater than $\alpha_2$ is made in the step (32) of the knocking suppressing program is that the delay of the ignition angle when the opening degree of the throttle valve is less than $\alpha_2$ could cause a shock due to a rapid reduction of the engine speed.

According to the above-described knocking control performed by the controller 29, it is possible to delay the ignition time intentionally for a predetermined period of time when the knock takes place during normal operation of the engine 11 and to resume the ordinary ignition timing after elapse of a predetermined time. Since the delay of the ignition timing is maintained for a predetermined time length, it becomes possible to prevent undersirable frequent delays of the ignition timing from the normal timing and reset to the normal timing, which may occur when knocking is observed frequently within the predetermined period mentioned above. It is, therefore, possible to avoid any too frequent and rapid change in the engine speed and the speed of the boat.

In addition, since the delay is performed in a stepped manner, it becomes possible to delay the ignition timing to such an extent as to sufficiently suppress the knocking, without being accompanied by a rapid decrease in the engine speed and the speed of the boat. Generally, engines such as outboard engines are subjected to a large variety of uses and operating conditions due to their natures, so that it is a common measure to delay the maximum ignition advance angle from the demanded advance angle, in order to avoid various undesirable circumstances such as deposition of carbon on the combustion chamber and piston, as well as knocking attributable to a mismatching of the spark plug or use of a gas having low octane value. Thus, in conventional engines, it is not possible to make full use of the performance of the engine. In contrast to the above, according to the knock suppression control of the invention, the engine is protected by avoiding a rapid deceleration of the engine when a knock has taken place in the engine, whereas, when the engine is operated under a normal condition without any knock, it is possible to make full use of the performance of the engine.

Figure 18:
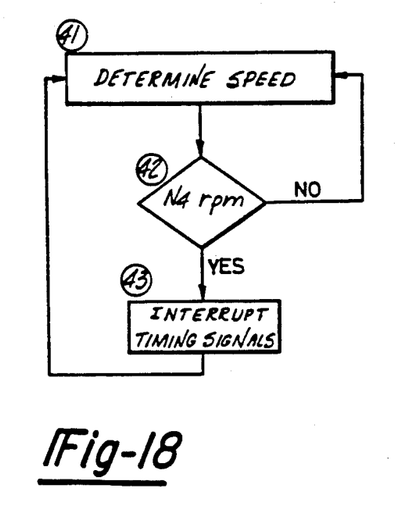
FIG. 18 is a flow chart illustrating the operation of the ignition control system for an overspeed running condition.

Hereinunder, an explanation will be made as to an overspeed prevention control method according to the present invention. This overspeed prevention control is conducted by an overspeed prevention program as shown in FIG. 18 stored in the controller 29. Namely, the controller 29 is adapted to process the output pulse frequencies from the pulser coils 32 corresponding to the first cylinder 11A, third cylinder 11C and the fifth cylinder 11E by means of an F/V converter 83, thereby to produce an output voltage corresponding to the engine speed in a step (41). Then, in a step (42) an overspeed comparator circuit 84 judges whether the output voltage from the F/V converter mentioned above is below a reference voltage $V_{02}$ corresponding to a predetermined speed, e.g. $N_4$ rpm, set in the voltage setting means 85. If the answer to the judgment in the step (42) is NO, the process returns to the step (41). To the contrary, if the result of judgment in the step (42) is YES, an overspeed comparator circuit 84 turns the transistor 86 ON intermittently. The emitter of the transistor 86 is connected to all signal lines which transmits the ignition signals for respective cylinders from the ignition signal generating means 31 to the CDI unit 38, while the collector of the transistor 86 is grounded. Therefore, if the result of the judgment made in the step (42) is YES, the transistor 86 is turned on intermittently. This will cause the ignition signals from the ignition signal generating means 31 to be transmitted to the CDI unit only intermittently, so that the ignition takes place intermittently in each cylinder thereby to prevent overspeed of the engine 11 in a step (43). The process then returns to the step (41).

Therefore, according to the overspeed prevention control performed by the controller 29, it is possible to prevent abnormal increase of the speed of the engine 11 under no load as in the case of the shifting to neutral gear condition, as well as other abnormal increases of the speed of the outboard engine to safety protect the engine against overspeed.

Figure 19:
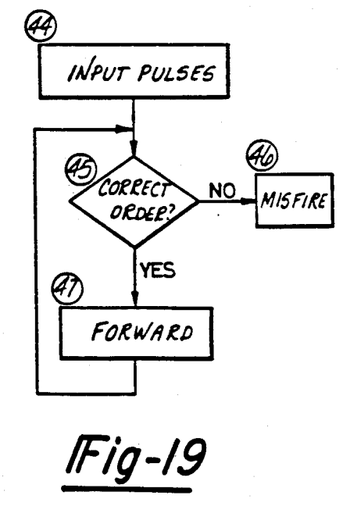
FIG. 19 is a flow chart illustrating the operation of the ignition control system for a reverse running condition.

An explanation will be given hereinunder as to a reverse prevention control performed by the controller 29. This reverse prevention control is executed in accordance with a reversing prevention program shown in FIG. 19 written in the controller 29. During the operation of the engine step (44), the ignition timing means 30 makes a judgment as to whether the output pulses $P_1$ to $P_6$ from the pulser coils 32 corresponding to respective cylinders are in correct order, i.e. $P_1$ $P_2$ $P_3$ $P_4$ $P_5$ $P_6$, in a step (45). If the answer to this judgment is NO, the ignition timing means 30 operates not to transmit the ignition timings for all cylinders to the ignition signal generating means 31 and effects a misfiring control of the CDI unit 38 in a step (46). If the result of judgment in the step (45) is YES, the ignition timing means 30 confirms that the engine 11 is operating in the forward direction in a step (47) and the process to the step (45) to continue ordinary ignition timing control. Therefore, according to the reverse prevention control by the controller 29, it is possible to prevent accidental reversing of the engine which cannot be perfectly avoided in 2 cycle engines.

It will be appreciated that the above disclosed embodiment is well calculated to achieve the aforementioned objectives of the present invention. In addition, it is evident that those skilled in the art, once given the benefit of the foregoing disclosure, may now make modifications of the specific embodiment described herein without departing from the spirit of the present invention. Such modifications are to be considered within the scope of the present invention which is limited solely by the scope and spirit of the appended claims.

What is claimed is:

1. A method of controlling the spark advance for an internal combustion engine, comprising the steps of:
   measuring the speed of said engine,
   measuring the air flow to the induction system of said engine,
   determining an optimum spark advance in response to said speed and air flow measurements and setting the spark advance to the optimum spark advance,
   sensing for the presence of a knock condition,
   varying said spark advance in a predetermined sequence upon detection of said knock condition only if both the speed and air flow measurements have exceeded individual predetermined threshold values, said predetermined sequence including the steps of retarding the spark advance from said optimum spark advance in predetermined increments over predetermined time intervals until said knock condition no longer exists, and then advancing the spark advance toward said optimum spark advance in a reverse order of said predetermined increments over said predetermined time intervals.

2. In an ignition control system for an internal combustion engine, means for providing a knock signal indicative of an engine knock condition, means for determining the presence of said knock condition from said knock signal, means for responding to the detection of said knock condition by varying the spark timing of said engine in a sequence which retards said spark timing in predetermined increments for predetermined time intervals until said knock condition no longer exists and then readvances said spark timing signal in a reverse order of said predetermined increments over said predetermined time intervals.

3. The invention as defined in claim 2 including means for providing a speed signal indicative of the speed of said engine, and means for providing a flow signal indicative of the air flow to the induction system of said engine, said responding means including means for varying said spark timing only when said speed signal has exceeded a predetermined speed level and said flow signal has exceeded a predetermined air flow level.

4. The invention as defined in claim 3 wherein said predetermined increments include two increments of different magnitudes.

* * * * *